United States Patent
Böhme et al.

[11] Patent Number: 5,850,898
[45] Date of Patent: *Dec. 22, 1998

[54] METHOD AND DEVICE FOR THE HYDRAULIC ACTUATION OF A CLUTCH, ESPECIALLY FOR AUTOMOBILES

[75] Inventors: Holger Böhme, Rentweinsdorf; Wilhelm Heubner, Kaltenbrunn; Norbert Oberlack, Höchstadt; Karl Peuker, Ebern; Herbert Sauer, Junkersdorf, all of Germany

[73] Assignee: Fahrzeugtechnik Ebern GmbH, Ebern, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 704,466

[22] Filed: Aug. 28, 1996

[30] Foreign Application Priority Data

Sep. 15, 1995 [DE] Germany .......................... 195 34 200.3
Aug. 20, 1996 [DE] Germany .......................... 196 33 420.9

[51] Int. Cl.⁶ .................................................. F16D 48/02
[52] U.S. Cl. ........................................ 192/54.3; 192/85 R
[58] Field of Search ................................ 192/3.58, 85 R, 192/85 C, 54.3

[56] References Cited

U.S. PATENT DOCUMENTS

| | | |
|---|---|---|
| 4,200,175 | 4/1980 | Dick . |
| 4,529,072 | 7/1985 | Oguma et al. . |
| 4,796,739 | 1/1989 | Jonner et al. . |
| 5,004,084 | 4/1991 | Mehr-Ayin et al. . |
| 5,064,036 | 11/1991 | Schneider . |
| 5,082,096 | 1/1992 | Yamashita et al. . |
| 5,135,090 | 8/1992 | Bertin et al. . |
| 5,135,091 | 8/1992 | Albers et al. . |
| 5,224,578 | 7/1993 | Rheinheimer et al. . |
| 5,303,807 | 4/1994 | Domeneghini . |

FOREIGN PATENT DOCUMENTS

| | | |
|---|---|---|
| 0 399 399 A1 | 11/1990 | European Pat. Off. . |
| 0 516 309 A2 | 12/1992 | European Pat. Off. . |
| 1 505 452 | 9/1969 | Germany . |
| 3243666 A1 | 5/1984 | Germany . |
| 34 15 092 C2 | 10/1985 | Germany . |
| 36 30 750 A1 | 3/1988 | Germany . |
| 37 06 849 A1 | 9/1988 | Germany . |
| 37 06 850 A1 | 9/1988 | Germany . |
| 4031631 A1 | 5/1991 | Germany . |
| 41 20 128 A1 | 1/1992 | Germany . |
| 41 21 016 A1 | 1/1992 | Germany . |
| 42 37 853 A1 | 5/1994 | Germany . |

(List continued on next page.)

*Primary Examiner*—Richard M. Lorence
*Attorney, Agent, or Firm*—McAndrews, Held & Malloy, Ltd.

[57] ABSTRACT

A method and a device for the hydraulic actuation of a clutch operatively connected to a clutch receiver cylinder (6), especially for automobiles, are disclosed, in which, in a servo circuit (S), a servo pressure is generated, which

- serves for the hydraulic governing of a clutch transmitter cylinder (2), in order to generate in a pressure circuit (D) a working pressure, which is applied to the clutch receiver cylinder (6), or
- is applied directly to the clutch receiver cylinder (6), in order to create there a force required for disengaging the clutch. According to the invention, the servo pressure for disengaging and engaging the clutch is adjusted in defined manner in the servo circuit (S), for which purpose the servo circuit (S) comprises a proportional valve (8, 8'). As a result, with technical equipment at low cost, an automated actuation with improved response and operational behaviour of the clutch is made possible. Furthermore, a method and a device for gear-shifting a mechanical gear are disclosed, in which the servo pressure of the clutch disengagement is used for shifting the clutch sleeves of the mechanical gear.

18 Claims, 6 Drawing Sheets

FOREIGN PATENT DOCUMENTS

| | | |
|---|---|---|
| 43 09 901 A1 | 9/1994 | Germany . |
| 44 26 260 A1 | 2/1995 | Germany . |
| 1 154327 | 6/1969 | United Kingdom . |
| 1 154328 | 6/1969 | United Kingdom . |
| 2 119 050 | 11/1983 | United Kingdom . |
| 2 204 374 | 11/1988 | United Kingdom . |
| 2 204 657 | 11/1988 | United Kingdom . |
| 2 280 721 | 2/1995 | United Kingdom . |
| 2 292 594 | 2/1996 | United Kingdom . |

METHOD AND DEVICE FOR THE HYDRAULIC ACTUATION OF A CLUTCH, ESPECIALLY FOR AUTOMOBILES

BACKGROUND OF THE INVENTION

This invention relates to a method for the hydraulic actuation of a clutch and to a device for carrying out the method. In particular, the invention relates to a method and a device for the automatic hydraulic actuation of an automobile clutch.

Automatic gearboxes for automobiles having internal combustion engines have become widespread in many forms of construction in the USA and Japan, where the market share for such gear boxes ranges between 75% and 85%. There are many reasons why a trend to greater automation of automobiles may be expected in Europe also. In particular, the higher frequency of gear changing due to increasing traffic density, requiring actuation of the clutch via the clutch pedal and changing gear via the gear lever, is becoming evermore tedious work. In addition, in the light of the increasingly strict exhaust gas and noise regulations, the internal combustion engine must be operated intentionally in favourable operating points. For example, to achieve the specified values in the warm-up phase as well, the measures adopted for the automobile, sometimes at considerable expense on equipment, for maintaining the specified values, such as the purification of the exhaust gases from the engine by means of a controlled catalyst, being sometimes not or not effectively realized because of the free choice of the gear ratio by the driver of the automobile.

Automatic clutch actuations for releasing a friction clutch on an automobile are already known in the state of the art and are produced in series.

Thus, for example, DE 37 06 849 A1, DE 37 06 850 A1 or DE 41 20 128 A1 describe automatic hydraulic clutch actuations, in which a clutch receiver cylinder operatively connected to the release bearing of the clutch is hydraulically governed by a clutch transmitter cylinder, in order to apply the force necessary for releasing the clutch. According to this state of the art, the clutch transmitter cylinder is provided with a mechanical actuating drive, which is driven through a worm gear by an electric motor in order to actuate the clutch transmitter cylinder. As a result, the clutch can in principle be automatically disengaged independently of a clutch pedal.

This state of the art does, however, have the disadvantage that there is a considerable mechanical expenditure requiring a relatively large installation space in order to guarantee permanently correct operation of the clutch actuation mechanism having regard to the wear of the components in relative movement.

In addition, from DE 36 30 750 A1 or DE 41 21 016 A1, automatic clutch actuation devices are known, in which a displacement pick-up is mounted on the clutch pedal and is connected to an electronic control unit. In the case of DE 36 30 750 A1, the control unit electrically controls a switching valve as a function of the signal from the displacement pick-up, in order to connect a piston-cylinder assembly, operatively connected to the release bearing of the clutch, optionally to a hydraulic pump, so that this pump, by pressure loading of the piston-cylinder assembly, applies the force required for releasing the clutch. In the case of DE 41 21 016 A1, the control unit electrically controls a valve unit comprising a volume-proportional control valve as a function of the signal from the displacement pick-up, in order to connect a piston-cylinder assembly, operatively connected to the release bearing of the clutch, via the valve unit to a pressure reservoir supplied from a hydraulic pump, so that the force required for releasing the clutch here again can be applied by pressure loading of the piston-cylinder assembly.

In the above described state of the art, problems exist in that a relatively large apparatus expenditure with rapid-response valves and correspondingly accurate displacement measuring equipment must be provided at the piston-cylinder assembly in order to prevent the piston-cylinder assembly and thus the clutch from being inadmissibly over-controlled. A fine regulation of the disengagement force for preventing, for example, clutch shocks is also impossible or at least difficult.

The same problems occur also in the automatic clutch actuation devices known from DE 42 37 853 A1 and DE 43 09 901 A1. According to this state of the art, a piston-cylinder assembly operatively connected to the disengagement mechanism of the clutch is hydraulically governed by an actuating cylinder in order to apply the force necessary for disengaging the clutch. The cylinder chamber of the actuating cylinder is divided by a piston into a servo chamber and a working chamber, of which the latter is hydraulically connected to the piston-cylinder assembly. The pressure in the working chamber and thus in the piston-cylinder assembly is determined by the pressure in the servo chamber, which in turn can be regulated by a volume-proportional regulating valve. An electronic control responds to the signal from a displacement pick-up representing the instantaneous position of a piston rod of the actuating cylinder piston and thus the instantaneous position of the disengaging mechanism of the clutch. The electronic control controls, via the control valve, the pressure in the servo chamber of the actuating cylinder volumetrically proportionally to the desired position of the disengaging mechanism.

Finally, automatic gear change systems for automobiles, by means of which a gear step of the gear can be automatically switched in or changed, are known in the state of the art and are also produced in series. These include automatic gears comprising hydraulically controlled planet wheel sets and hydrodynamic converters, infinitely adjustable gears with and without gear steps and start-up clutch and also double clutch gears. Whereas, in the case of automatic gears with hydraulically controlled planet wheel sets and hydrodynamic converters, even after prolonged optimization and the use of expensive converter bridging clutches, the efficiency of the torque transfer achieved still remains clearly lower than, and the cost of equipment considerably higher than, in the case of hand-operated gears. The degrees of efficiency of the torque transfer in the infinitely variable gears is even lower still than in conventional automatic gears. Double clutch gears, in contrast, are still more costly with regard to equipment than conventional automatic gears, and certain changing sequences cannot be directly carried out by them.

To summarize, it can be established that the known automatic clutch and gear actuation systems, in comparison to the conventional manual actuation systems, still require to be improved in respect of their response and operation behaviour, taking into account an appropriate expenditure on equipment, especially low cost and smaller space requirement.

SUMMARY OF THE INVENTION

Compared with the above-described state of the art, the objective of the invention therefore is, starting from the state of the art according to, for example, DE 43 09 901 A1, to create a process and a device for the automatic actuation of a clutch which, with low expenditure on equipment, shall make possible an improved response and operational behaviour of the clutch.

According to the invention, in the hydraulic actuation of the clutch, which is operatively connected to the clutch receiver cylinder, a servo pressure is generated in a servo circuit which serves as the hydraulic governing of the clutch transmitter cylinder in order to generate in the pressure circuit a working pressure which is applied, directly or indirectly to the clutch receiver cylinder, in order to apply to the clutch receiver cylinder the force required for releasing the clutch.

The servo pressure for disengaging and engaging the clutch is adjusted in defined manner in the servo circuit. For this purpose, according to this invention, the servo circuit is equipped with a proportional valve, by means of which the servo pressure in the servo circuit is adjustable in a defined manner.

By the defined adjustment or control of the servo pressure in the servo circuit, it is possible—in contrast to the state of the art according to which the volumetric flow of the pressure fluid in the servo circuit is controlled by means of a volume-proportional regulator valve—to apply in finely metered manner that protects the clutch, the force necessary for disengaging the clutch, so that a good response and operating behaviour of the clutch, such as an engagement operation of the clutch tuned in optimum manner to the vehicle and its operating state, a problem-free switching operation with slipping clutch, "racing start" with slipping clutch without inadmissibly increased loading of the clutch etc., can be assured. In particular, volumetric fluctuations of the pressure fluid in the servo and pressure circuit, which may be caused by temperature influences, compressibility losses due to air and water content of the pressure fluid, fluid losses through the balancing bore of the clutch transmitter cylinder, "slurring" at the lining springs and/or axial knock of the crankshaft, have no influence upon the control of the engagement and disengagement operations.

Since, furthermore, the clutch pedal conventionally rigidly connected to the clutch transmitter cylinder, is dispensed with, the pedal modules can advantageously be installed in simplified manner, only a small cut-out in the dashboard being necessary and the connection of the hydraulic piping being possible in the pre-assembled stage. Moreover, by a simple replacement or removal of the clutch transmitter cylinder and provision of the servo circuit, well-proven hydraulic clutch actuation devices can be fitted later. Finally, compared with the conventional hydraulic clutch actuation systems, large advantages in space, especially a higher flexibility, are obtained, because the components of the servo circuit can be installed decentralized from the clutch transmitter cylinder and clutch receiver cylinder.

According to the invention, in the disengagement of a clutch, for which the characteristic of the disengagement force over the disengagement travel has substantially the form of a downwardly open parabola (so-called "drop-off" characteristic), the disengagement travel or a value proportional thereto, together with a value representing the slip between drive and take-off of the clutch, is determined, and the engagement of the clutch is regulated on the basis of the values determined, so that a gentle engagement of the clutch is possible. With advantage here, the position of the piston in the clutch transmitter cylinder or the position of the piston in the clutch receiver cylinder may be used as a value proportional to the disengagement travel of the clutch.

According to the invention, in the disengagement of a clutch, for which the characteristic of the disengagement force over the disengagement travel increases steadily with increasing disengagement travel, the disengagement force or a value proportional thereto, together with a value representing the slip between drive and take-off of the clutch, is determined, and the engagement of the clutch is regulated on a basis of the values determined. This control also makes possible a gentle engagement of the clutch. Furthermore, in this control method, a displacement pick-up for detecting the disengagement travel or a value proportional thereto and an expensive resetting when the clutch friction linings become worn, can advantageously be dispensed with. With a force-proportional control of this type of the engagement operation, further advantages result compared with a displacement-dependent control, in that perturbing variables, such as thermal expansions of the clutch pressure plate, of the clutch disc, of the diaphragm spring etc., or superimposed movements at the clutch or clutch actuation system caused by axial vibrations of the crankshaft, have no influence upon the control. Also, clutches having a continually rising characteristic of the disengagement force can be more simply constructed than clutches, in which the characteristic of the disengagement force has a "drop-off" characteristic.

According to the invention, for such a control, the working pressure in the pressure circuit or the servo pressure in the servo circuit can be used as the value proportional to the disengagement force of the clutch. Preferably, however, the coil current of a magnetic drive of a proportional valve provided in the servo circuit for regulating the servo pressure, or the coil current of an electric motor provided for driving a hydraulic pump in the servo circuit, serves as the value proportional to the disengagement force of the clutch because no additional sensors are required for detecting these values.

According to the invention, the engagement of a clutch, in which the characteristic of the disengagement force over the disengagement travel substantially has the form of a downwardly open parabola, is advantageously regulated in the discontinuous partial region characteristic by the method according to the invention and in the continuous partial region of the characteristic by the method according to the invention. In such a mixed method, therefore, the engagement of the clutch is regulated on the basis of the detected disengagement travel or the variable proportional thereto until the form of the characteristic over the disengagement travel is unambiguous. After this, the control is switched over and is continued on the basis of the detected disengagement force or the variable proportion thereto, in order to assure an especially finely sensitive engagement of the clutch.

The invention also provides for tuning the loading of the clutch in such a manner that a torque follow-up is created, according to which the engine torque of a drive connected to the clutch is ascertained. As a function of the ascertained engine torque, a servo pressure is set in the servo circuit, which applies a force directly or via the clutch transmitter cylinder by means of the clutch receiver cylinder to the clutch, which makes possible the transmission through the clutch of a torque which is smaller than the maximum torque that can be transmitted by the clutch, but is greater by a predetermined amount than the instantaneously ascertained engine torque. As a result, the actuation speed of the clutch pressure plate necessary for the disengagement operation is reduced, so that this plate can be promptly and completely disengaged even with a rapid gear change.

According to the invention, the servo pressure set in the servo circuit as a function of an initially determined engine torque is not again reset until a later determined engine torque differs by a predetermined amount from the initially ascertained engine torque, so that the control of the servo pressure in the servo circuit is simplified.

The hydraulic effective surface on the servo chamber side of the piston of the clutch transmitter cylinder can, according to the circumstances of the hydraulic effective surface of the piston on the working chamber side, be equal to or smaller than the latter, but preferably the arrangement will be made, in which the hydraulic effective surface of the piston of the clutch transmitter cylinder on the servo chamber side is greater than the hydraulic effective surface of the piston on the working chamber side. In this way a hydraulic step-up or amplification in the clutch transmitter cylinder is realized in a simple manner.

According to the invention, the proportional valve has, in the servo circuit, a valve body, which limits in electromagnetically controllable manner a valve gap through which a pressure fluid is forced when the clutch is actuated, for the purpose of adjusting in defined manner the servo pressure as pressure head in a pressure chamber of the proportional valve, which is connected to the servo chamber of the clutch transmitter cylinder or to the clutch receiver cylinder.

According to the invention, the pressure chamber of the proportional valve is connected to a hydraulic pump which, when the clutch is actuated, supplies the pressure fluid through the valve gap of the proportional valve. Accordingly, a hydraulic pump already present in the automobile can, advantageously, serve in principle for generating the servo pressure.

The invention further provides that the servo circuit has a proportional valve, prestressed in the blocking-zero-setting, which comprises a pressure chamber, hydraulically connected to a pressure source and to the servo chamber of the clutch transmitter cylinder or to the clutch receiver cylinder, and a valve body. The valve body limits in electromagnetically controllable manner a valve gap through which a pressure fluid is forced when the clutch is being engaged, so that the servo pressure can be adjusted in defined manner as pressure head in the pressure chamber, and is prestressed against the pressure in the pressure chamber by means of a closure spring, the prestress force of which is equal to the force that acts on the valve body at the pressure chamber side when the maximum working pressure in the pressure circuit or servo pressure in the servo circuit necessary for disengaging the clutch occurs. As a result, the magnetic drive in the proportional valve does not need to be energized in disengagement of the clutch, because the servo pressure required for generating the maximum working pressure necessary for disengaging the clutch or the maximum servo pressure necessary for disengaging the clutch can build up against the force of the closure spring in the pressure chamber of the proportional valve.

According to the invention, the proportional valve is constructed advantageously as a ball seat valve having a spherical valve body which, together with an annular valve seating, bounds the valve gap of the proportional valve. Thus the servo pressure can be precisely adjusted through an inexpensive and small proportional valve, the position of which is not tied to a specific location in the automobile, such as at the clutch transmitter cylinder or at the clutch receiver cylinder, but can be freely selected.

The invention still further provides for connecting to the servo circuit a switching circuit, which serves for the hydraulic actuation of a gear-shift mechanism, for which purpose the switching circuit possesses, for each shift step of the gear-shift mechanism, a switching cylinder and a proportional valve, connected to the pressure side of the servo circuit, for governing the switching cylinder. The switching circuit also has a switching valve which connects the switching circuit optionally to a suction side of the servo circuit. According to the invention, the proportional valve of the switching circuit is preferably an electromagnetically controllable ball seat valve, which is prestressed in the blocking-zero-position.

Thus it is possible, in advantageous manner, to utilize the servo pressure generated in the servo circuit and adjusted in defined manner for the hydraulic actuation of proven mechanical gear-shift mechanisms having a good efficiency of torque transfer. Any desired switching (gear-shift) sequences can be realized without problems. The gear-shift mechanism is, furthermore, carefully handled, because the change of gear step can take place in a defined manner, an individual adaptation of the actuating forces for the gear-shift mechanism being possible by the proportional valves in the hydraulic circuit. Finally, the conventional gear-shift linkage can be dispensed with, so that the installation of the transmission train is facilitated and space advantages are achieved.

DESCRIPTION OF THE DRAWINGS

The invention is explained in more detail below with reference to preferred examples of embodiment thereof and in relation to the drawing, like or similar components being given the same references. The figures in the drawing show.

DESCRIPTION OF THE PREFERRED EMBODIMENTS

Figure 1:
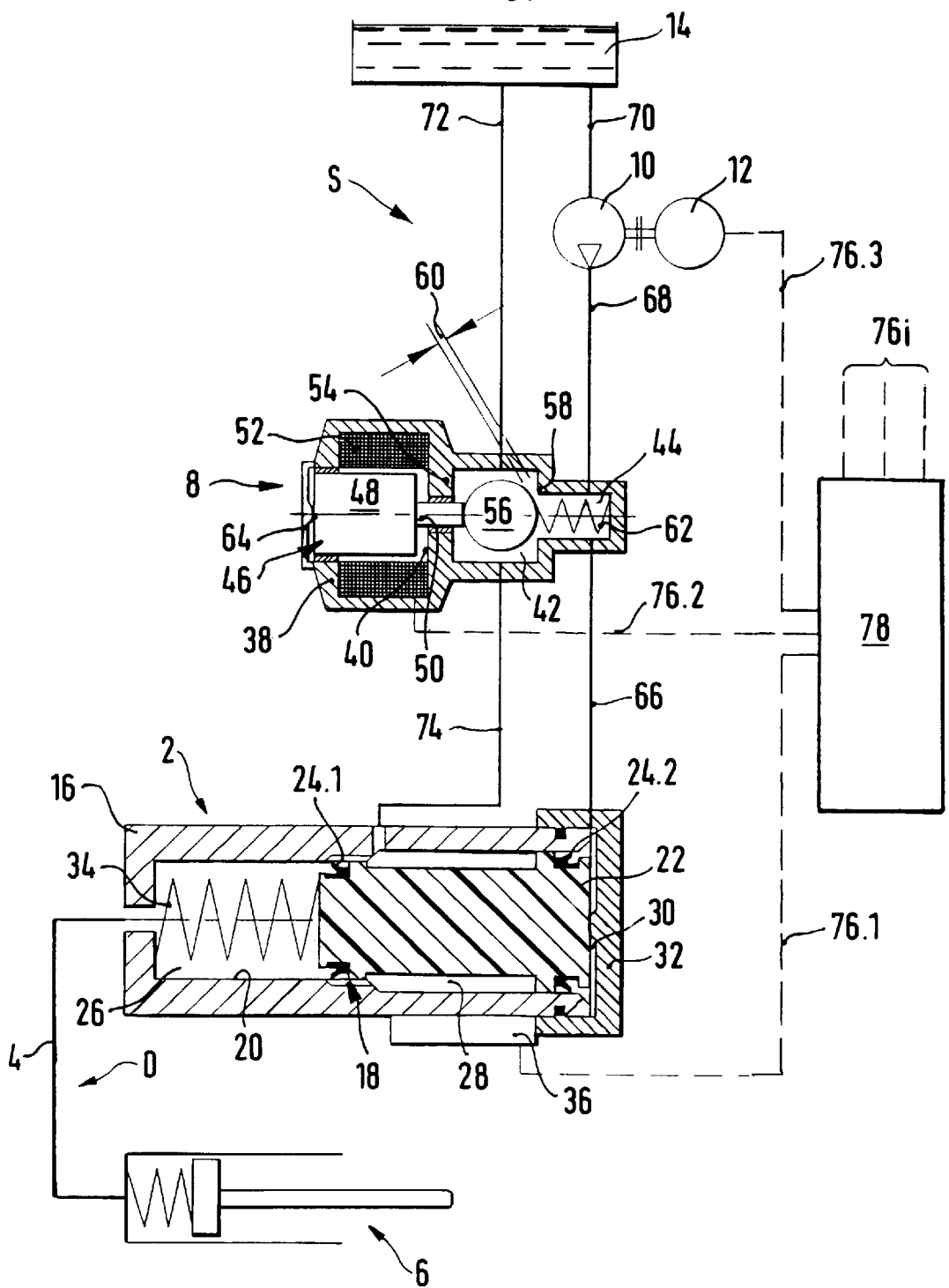
FIG. 1 a general diagram of a first embodiment of the hydraulic clutch actuating system according to the invention, comprising a clutch transmitter cylinder between servo circuit and pressure circuit and also a proportional valve and a hydraulic pump for generating and infinitely adjusting the servo pressure in the servo circuit, FIG. 2A a coupling characteristic with so-called "drop-off" characteristic, in which the clutch torque M, the disengagement (clutch release) force F and the coil current $I_V$ of a magnetic drive in the proportional valve of the servo circuit and the current $I_M$ of an electric motor for driving the hydraulic pump in the servo circuit are plotted as a function of the disengagement travel a of the clutch pressure plate.

FIG. 1 shows the first embodiment of the hydraulic clutch actuation system according to this invention, in the non-actuated state. According to FIG. 1, the hydraulic clutch actuation system comprises a clutch transmitter cylinder 2, which is connected via a pressure line 4 to a clutch receiver cylinder 6 to form a pressure circuit D, so that by actuation of the clutch transmitter cylinder 2 a clutch pressure plate (not illustrated) operatively connected to the clutch receiver cylinder 6 can be loaded with a disengagement force, in order to lift the clutch pressure plate from a clutch disc (not shown) and thus disengage the clutch.

Furthermore, the hydraulic clutch actuating system comprises a hydraulic servo circuit S for controlling the pressure circuit D via the clutch transmitter cylinder 2. The hydraulic servo circuit S comprises the clutch transmitter cylinder 2, a proportional valve 8 as pressure generating unit, a hydraulic pump 10, which can be driven by an electric motor 12 or an electromagnetic clutch, and also a storage vessel 14 for the pressure fluid, such as brake fluid, mineral oil etc. For the circuit connection of these components, more will be said after the following description of the individual components.

The clutch transmitter cylinder 2 has a housing 16 comprising a pressure balancing and follower device 18, which is formed on a housing bore 20 of the housing 16, in which a hydraulically sealed piston 22 is housed axially displaceable and guided along the housing bore 20. The piston 22 is provided, at each of its end portions at the outer periphery, with a sealing element 24.1, 24.2 and is of reduced diameter between the sealing elements 24.1, 24.2. The piston 22 divides the housing bore 20 of the clutch transmitter cylinder 2 into a working chamber 26, bounded by the one end face of the piston 22, the left sealing element 24.1 in FIG. 1, and the housing 16, a follower chamber 28, concentrically surrounding the piston 22, which is bounded radially outwards by the housing 16 and at either end by the sealing elements 24.1, 24.2, and a servo or amplifier chamber 30, which is bounded by the other end face of the piston 22, the right sealing element 24.2 in FIG. 1, the housing 16 and a housing base 32, mounted fluid-tight on the housing. In the working chamber 26 a compression spring 34 is disposed, which holds the piston 22 in the unactuated state, i.e. in its basic position, in abutment against the housing base 32. In this basic position of the piston 22, the pressure balancing and follower device 18 connects the follower chamber 28 to the working chamber 26 of the clutch transmitter cylinder 2.

Furthermore, at the clutch transmitter cylinder 2, depending upon the characteristic of the displacement-disengagement force curve of the clutch pressure plate, which will be discussed further later, a displacement pick-up 36 is mounted, by means of which the position of the piston 22 in the housing bore 20 of the clutch transmitter cylinder 2 can be determined. The displacement pick-up 36 can, however, equally well be disposed in the clutch transmitter cylinder 2 or on or in the clutch receiver cylinder 6.

The proportional valve 8, serving as pressure generating unit, is constructed as an electromagnetically actuated 2/2 ball seat valve, which in the non-controlled state is switched into the through-zero setting. The proportional valve 8 has a three-chamber valve housing 38, which comprises an armature chamber 40, an outlet chamber 42 and a pressure chamber 44, which are arranged in succession in this order in FIG. 1 from left to right concentrically to the central axis of the valve housing 38.

In the armature chamber 40 of the proportional valve 8, a control piston 46 is housed, which consists of a ferromagnetic armature 48 and a valve stem 50, centrally mounted thereon. In the radial wall of the armature chamber 40, a magnetic coil 52 is provided, which at least partly concentrically surrounds the armature 48 and together with the armature 48 forms a magnetic drive, by means of which the control piston 46 can be displaced in defined manner in the axial direction of the armature chamber 40. The valve stem 50 of the control piston 46 is guided hydraulically sealed in a partition wall 54 of the valve housing 38 between the armature chamber 40 and the outlet chamber 42 and projects into the outlet chamber 42.

In the outlet chamber 42 a valve body 56 is disposed, which is formed as a metal ball, which can be mechanically loaded with an actuating force by the valve stem 50 of the control piston 46, passing in sealed manner through the partition wall 54 between the armature chamber 40 and the outlet chamber 42. The valve body 56 can be loaded via the valve pin 50 of the control piston 46 only with a compressive force, since the valve body 56 and the valve stem 50 are two separate components.

The outlet chamber 42 is adjoined by the pressure chamber 44, of smaller diameter. At the end of the pressure chamber 44 nearer the outlet chamber, an annular valve seating 58 is formed concentrically to the central axis of the control piston 46, which seating together with the valve body 56 bounds a valve gap 60, the flow cross-section of which corresponds to the throttle cross-section of the proportional valve 8. In the pressure chamber 44, a restoring spring 62 is mounted, which presses the valve body 56 against the valve stem 50 of the control piston 46.

In the through-zero setting of the proportional valve 8, the valve gap 60 between valve body 56 and valve seating 58 is open to the maximum by the restoring force of the restoring spring 62, the control piston 46 being pressed indirectly through the valve body 56 against a stop 64 at the end of the armature chamber 40 remote from the outlet chamber 42. The maximum possible stroke of the armature 48 of the control piston 46 in the armature chamber 40 corresponds at least to the closure travel of the valve gap 60, so that by axial displacement of the control piston 46 by the magnetic drive consisting of armature 48 and magnetic coil 52, the valve gap 60 can be set in a defined manner.

The clutch transmitter cylinder 2 and the proportional valve 8 are connected as follows to the hydraulic pump 10 and the storage vessel 14.

The amplifier chamber 30 of the clutch transmitter cylinder 2 is connected via a pressure line 66 to the pressure chamber 44 of the proportional valve 8, which is connected by a pressure line 68 to the delivery of the hydraulic pump 10. The intake of the hydraulic pump 10 is connected via a suction line 70 to the storage vessel 14. The storage vessel 14 is connected, via an outlet line 72, to the outlet chamber 42 of the proportional valve 8, which is connected via a follower line 74 to the follower chamber 28 of the clutch transmitter cylinder 2. It will be evident to the skilled person that the pressure line 66 does not need to be connected to the pressure line 68 via the pressure chamber 44 of the proportional valve 8, but can also be branched directly from the pressure line 68. Likewise, the follower line 74 does not need to be connected via the outlet chamber 42 of the proportional valve 8 to the outlet line 72, but can branch from the outlet line 72 or be connected directly to the storage vessel 14.

Finally, the displacement pick-up 36 of the clutch transmitter cylinder 2, the magnetic coil 52 of the proportional valve 8 and the electric motor 12 or electromagnetic clutch are connected via signal lines 76.1, 76.2 and 76.3 respectively to a control electronic unit 78, which is connected via further signal lines 76i to further control or signal elements (not shown).

The method of functioning of the first example of embodiment of the hydraulic clutch actuating system according to the invention is now described below.

If a gear change is manually initiated by the driver of the automobile via a tap switch, preselector switch or gear-shift lever switch (not illustrated), or automatically by changing of one or more control variables, such as engine speed, gear input speed, vehicle speed, accelerator pedal setting etc., via a gear transmitter (not illustrated), then an automatic clutch operation is started by the control electronic unit 78, in that a signal is transmitted via the signal line 76.3 to the electric motor 12 or the electromagnetic clutch, so that the hydraulic pump 10 is driven by the electric motor 12 or is coupled by the electromagnetic clutch to a revolving shaft of the automobile, for example to one wheel or to the internal combustion engine. The pressure fluid is now circulated, largely unpressurized, by the hydraulic pump 10, starting from the storage vessel 14, via the intake line 70, the hydraulic pump 10, the pressure line 68, through the pressure chamber 44 of the proportional valve 8, past the valve body 56 and valve seating 58 through the valve gap 60, into the outlet chamber 42 of the proportional valve 8 and from the outlet chamber 42 via the outlet line 72 back into the storage vessel 14. In the substantially unpressurized circulation of the pressure fluid, the piston 22 of the clutch transmitter cylinder 2 is not displaced against the force of the compression spring 34 in the working chamber 26 of the clutch transmitter cylinder 2 into the working chamber 26.

For generating the hydraulic servo pressure and the volumetric flow in the amplifier chamber 30 of the clutch transmitter cylinder 2, which are necessary for lifting the clutch pressure plate operatively connected to the clutch receiver cylinder 6, the magnetic coil 52 of the proportional valve 8 is now controlled by the control electronic unit 78 via the signal line 76.2. By the electromagnetic actuating force generated by means of the magnetic drive consisting of armature 48 and magnetic coil 52, the valve body 56 of the proportional valve 8 is now displaced by the valve stem 50 of the control piston 46 against the restoring force of the restoring spring 62 and the onward flowing force of the circulating pressure fluid at the valve body 56, towards the valve seating 58. As the valve body 56 approaches the valve seating 58, the valve gap 60 and therefore the flow cross-section for the circulated pressure fluid decreases. As a result, a defined pressure head builds up in the pressure chamber 44 of the proportional valve 8 in the flow direction of the pressure fluid upstream of the valve gap 60, which pressure head serves as servo pressure for the servo circuit S and the value of which is dependent upon the width or aperture of the valve gap 60 and the volumetric flow delivered by the hydraulic pump 10. At the same time, a reaction force acts on the valve body 56 of the proportional valve 8, the magnitude of which is dependent upon the effective hydraulic active area of the valve body 56 when in bearing against the valve seating 58. This reaction force reacts via the valve body 56 on the valve stem 50 of control piston 46 and to a good approximation is proportional to the pressure head in the pressure chamber 44, i.e. to the servo pressure of the servo circuit S. Therefore, in particular, a proportional magnetic drive with corresponding current-force characteristic is suitable for the electromagnetic control of the control piston 46, so that the pressure head or servo pressure of the servo circuit S, generated at the valve gap 60 through which the pressure fluid is forced to flow, is infinitely adjustable in defined manner by infinite adjustment of the valve gap 60 via the valve stem 50. The viscosity of the pressure fluid has only a subordinate influence upon the servo pressure in the servo circuit S, because small volumetric flows of the incompressible pressure fluid and its continual circulation through the storage vessel 14 ensure adequate cooling and therefore constant operating temperature in the servo circuit S.

The defined servo pressure generated as described above of the servo circuit S is present, starting from the pressure chamber 44 of the proportional valve 8, via the pressure line 66 in the amplifier chamber 30 of the clutch transmitter cylinder 2, and loads the hydraulic active surface of the piston 22, on the amplifier chamber side, of the clutch transmitter cylinder 2, so that the piston 22 is displaced against the force of the compression spring 34 into the working chamber 26 of the clutch transmitter cylinder 2. In doing this, the sealing element 24.1, mounted on the left end of the piston 22 in FIG. 1 and associated with the working chamber 26, passes over the pressure balancing and follower device 18 towards the left in FIG. 1, so that a working pressure builds up in the working chamber 26 of the clutch transmitter cylinder 2. This working pressure is also present, via the pressure line 4, in the clutch receiver cylinder 6, so that the latter can lift the clutch pressure plate off the clutch disc.

The displacement pick-up 36 mounted on the clutch transmitter cylinder 2 is predominantly necessary for clutch characteristic curves having a so-called "drop-off" characteristic, in which the disengagement force for the clutch, plotted against the disengagement travel, has substantially the form of a downwardly open parabola, as described in more detail below. By means of the position of the piston 22 of the clutch transmitter cylinder 2, detected by the displacement pick-up 36, an unambiguous association of the disengagement travel or position of the disengaged clutch pressure plate in relation to the actuating force can then be obtained for the control electronic unit 78 for the purpose of the control.

If the clutch pressure plate has been completely disengaged by the clutch receiver cylinder 6, the gear change operation at the gearbox of the vehicle is carried out by means of the gear lever of the automobile or the gear transmitter.

After completion of the gear change operation, the clutch pressure plate is again brought into force engagement with the clutch disc. For this purpose, the current applied via the signal line 76 to the magnetic coil 52 is reduced by means of the control electronic unit 78 according to a predetermined control characteristic, the electromagnetic actuating force at the control piston 46 of the proportional valve 8 being reduced to zero according to a control equation. The pressure head or servo pressure of the servo circuit S, generated by the circulated pressure fluid in the pressure chamber 44 of the proportional valve 8, thereby acts upon the hydraulic active surface of the valve body 56 and, supported by the restoring force of the restoring spring 62, pushes the valve body 56 together with the control piston 46 off the valve seating 58, so that the valve gap 60 increases with reduction of the pressure head in the pressure chamber 44 until the control piston 46 meets the abutment 64 in the armature chamber 40. The servo pressure of the pressure fluid thus decreases, with constant volumetric flow in the servo circuit S, to zero according to a predetermined pressure curve, the piston 22 of the clutch transmitter cylinder 2, which is loaded at its hydraulic active surface on the side towards the amplifier chamber with the decreasing servo pressure of the servo circuit S, being displaced into its basic setting in bearing against the housing end 32 of the clutch transmitter cylinder 2, because of the force of the compression spring 34 and the hydraulic loading of its hydraulic active surface on the working chamber side by the clutch receiver cylinder 6, loaded with the spring-loaded clutch pressure plate. The hydraulic connection of the working chamber 26 of the clutch transmitter cylinder 2 to the storage vessel 14 is now made again by the pressure balancing and follower device 18, the follower line 74, the outlet chamber 42 of the proportional valve 8 and the outlet line 72.

Figure 2A:
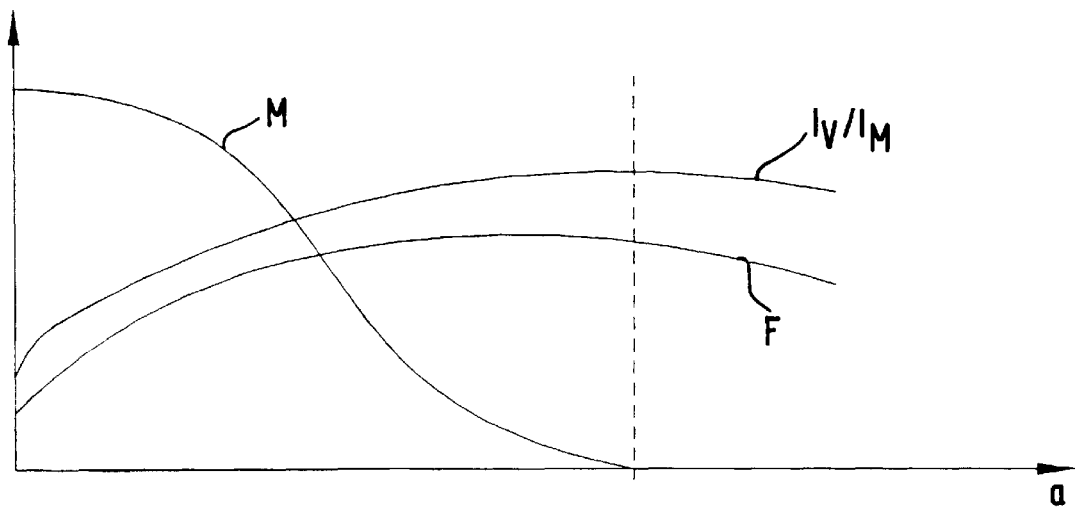
FIG. 2B shows a view corresponding to FIG. 2A of a clutch characteristic having a substantially linear or steadily rising characteristic, FIG. 3 a general diagram of a variant of the embodiment of the hydraulic clutch actuating system according to the invention shown in FIG. 1, in which a different proportional valve is used in the servo circuit, FIG. 4 a general diagram of a second embodiment of the hydraulic clutch actuating system according to the invention without clutch transmitter cylinder, in which the servo circuit is connected directly to the clutch receiver cylinder, but otherwise corresponds to the servo circuit according to FIG. 1, FIG. 5 a general diagram of a third embodiment of the hydraulic clutch actuating system according to the invention, which compared to the first example according to FIG. 1 is equipped with an additional hydraulic circuit for shifting a mechanical gear-shift mechanism comprising several shift steps, FIG. 6 a general diagram of the proportional valve provided in the additional hydraulic circuit for the shift actuation according to FIG. 5 for each shift step, to a larger scale, and FIG. 7 a general diagram of a connection between the switching cylinder provided in the additional hydraulic circuit for gear-shift actuation according to FIG. 5 for each switching step of the mechanical gear and a clutch sleeve of the mechanical gear.

The first example of embodiment of the hydraulic clutch actuation system according to this invention was described above in connection with a clutch, the characteristic curve of which exhibits a "drop-off" characteristic. In FIG. 2A, a characteristic of this type is shown, as it basically finds a standard application in mechanical clutches that are manually released. A feature of this characteristic is that the form of the disengagement force F over the disengagement travel a is constructively predetermined by suitable construction of the diaphragm springs of the clutch in such a way that both the engagement and also the disengagement points of the clutch lie at a higher force level than the force that is required for holding the clutch pressure plate in the disengaged state. This has the advantage that when a clutch plate is disengaged by pressing down on the clutch pedal, the actuating force demanded at the clutch pedal has a moderate value, so that even a fairly long holding of the clutch pressure plate in the released state does not tire the driver of the vehicle. On the basis of this characteristic curve, in the automatic hydraulic clutch actuation described with reference to FIG. 1, the displacement pick-up 36 is necessary, in order to make possible an unambiguous association of the disengagement force F to the disengagement travel a and thus to the clutch torque M.

Figure 2B:
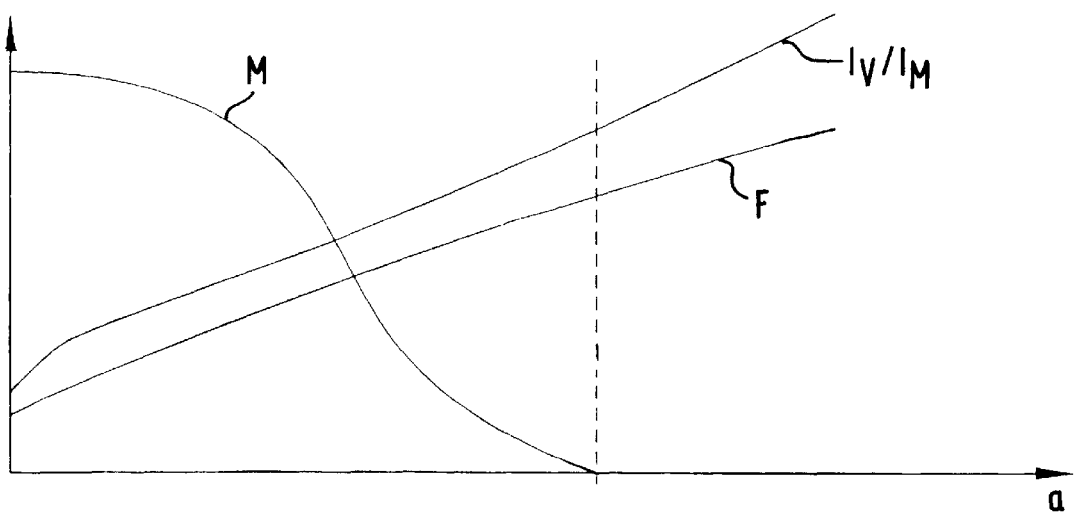

With the automatic hydraulic clutch actuation system according to this invention, clutches may also be used which have a clutch characteristic curve with a characteristic that is substantially linear or continually rising, that is with a substantially linear or continually rising form of the disengagement force F over the disengagement travel a of the clutch pressure plate, because the disengagement force F does not need to be applied by the driver of the automobile and thus the form of the disengagement force F over the disengagement travel a is of subordinate importance. In FIG. 2B such a characteristic curve is shown. The displacement pick-up 36 for detecting the disengagement travel a of the clutch pressure plate can advantageously be omitted in a clutch of this type, because the disengagement force F stands in an unambiguous relationship to the disengagement travel a of the clutch pressure plate and thus to the clutch torque M.

For a defined or finely sensitive control of the clutch torque M in engaging the clutch, i.e. when the clutch pressue plate and the entraining disc of the clutch come into engagement via the friction linings, the knowledge of the release force F of the clutch or of a value linked therewith, such as the working pressure in the pressure circuit D, the servo pressure in the servo circuit S, the coil current $I_V$ of the magnetic drive in the proportional valve 8 or the current $I_M$ of the electric motor 12 for driving the hydraulic pump 10, is sufficient. The disengagement force F with constant hydraulic active surfaces at the piston 22 of the clutch transmitter cylinder 2 is here solely a function of the working pressure in the pressure circuit D or of the servo pressure in the servo circuit S, while the working pressure in the pressure circuit D or the servo pressure in the servo circuit S in turn arises as a function of the coil current $I_V$ of the magnetic drive in the proportional valve 8 or of the current $I_M$ of the electric motor 12 for driving the hydraulic pump 10.

Basically, it is possible to ascertain the working pressure in the pressure circuit D or the servo pressure in the servo circuit S by means of a pressure sensor (not illustrated), which is hydraulically connected to the pressure line 4 in the pressure circuit D or the pressure line 66 in the servo circuit S and is connected by means of a signal line (not shown) to the control electronic unit 78. The pressure sensor supplies actual values for an underlying pressure control circuit, in order to improve the control quality of the entire system and thus to assure a finely sensitive engagement of the clutch. In such a control, the disengagement of the clutch, i.e. the separation of the frictional engagement between clutch pressure plate and entraining disc, is recognised by sensing the difference in rotational speed or the slip between clutch pressure plate and entraining disc and the working pressure or servo pressure applied for this purpose is measured and stored. These values are now available, together with further signals that are fed to the control electronic unit 78 via the signal lines 76, to the control electronic unit 78 for the purpose of regulating a rapid and comfortable engagement operation.

As actual value for such an underlying control circuit, the coil current $I_V$ of the magnetic drive in the proportional valve 8 or the current $I_M$ of the elctric motor 12 for driving the hydraulic pump 10 may also serve, which (actual value) is proportional to the servo pressure and the servo circuit S and, starting from the control electronic unit 78, is applied via the signal line 76.2 or 76.3 to the magnetic coil 52 in the proportional valve 8 or to the electric motor 12. In this case, a pressure sensor for detecting the working or servo pressure is not required. For disengaging the clutch, when the hydraulic pump 10 is being driven by the electric motor 12, the valve gap 60 of the proportional valve 8 is reduced as described by an increasing current flow through the magnetic drive of the proportional valve 8, so that a servo pressure in the servo circuit S builds up, which is applied to the clutch transmitter cylinder 2 and thus has the effect of increasing the working pressure in the pressure circuit D. As soon as the disengagement of the clutch is detected as described above by rotational speed sensing of engine and take-off or clutch pressure plate and entraining disc, the coil current $I_V$ of the magnetic coil 52 in the proportional valve 8 or the current increase $I_M$ of the electric motor 12 for driving the hydraulic pump 10, which now supplies the pressure fluid against the resistance of the increasing servo pressure in the servo circuit, is measured and stored. On the basis of these values and of other signals, the control of a rapid and comfortable engagement operation can now take place via the control electronic unit 78, the engagement of the clutch being effected only by reduction of the coil current $I_V$ of the magnetic coil 52 in the proportional valve 8, as described above. In the outcome it is possible, when using a clutch having a substantially linear or at any rate continuously rising characteristic of the clutch characteristic curve, to regulate the clutch torque M to be transmitted between the clutch pressure plate and the entraining disc independently of the disengagement travel a of the clutch pressure plate.

Moreover, in clutches having a characteristic curve according to FIG. 2A, a mixed process of the above described controls of the engagement operation is possible. Accordingly, the engagement of the clutch in the discontinuous partial region of the characteristic is regulated on the basis of the detected disengagement travel or a value proportional thereto until the form of the characteristic over the disengagement travel is unambiguous after passing beyond the apex point of the characteristic. Then, that is in the continuous partial region of the characteristic, the control is switched over and is continued on the basis of the detected disengagement force or a value proportional thereto in order to assure an especially sensitive engagement of the clutch.

In the above description, the pressure fluid, before the actual operation of the clutch, circulates virtually unpressurized in the servo circuit S. An advantageous alternative to the virtually pressure-free circulation of the pressure fluid is provided by the governing of the pressure circuit D via the servo circuit S to a follow-up of the torque, the basic idea of which is to close the clutch not to the maximum transmissible clutch torque, but only to close it sufficiently far that the transmissible clutch torque always lies just above the present engine torque of the internal combustion engine of the automobile.

In the case of the torque follow-up, a possible desire to switch or possible gear change is promptly recognised by the control electronic unit 78 from a change of one or more control parameters, such as engine speed, vehicle speed, accelerator pedal position etc., which are transmitted via the signal lines 76*i* to the control electronic unit 78, which then governs the pressure circuit D via the servo circuit S as described above, in order to generate, via the clutch receiver cylinder 6, a clutch torque at the clutch which is always just above the present engine torque.

An advantage of the torque follow-up is, in particular, to be seen in the feature that the clutch pressure plate can be promptly and completely disengaged with reduced actuation speed even in a quick gear change.

The torque follow-up also develops an advantageous action in load changes, wherein the jerky vibrations easily generated at the clutch or induced in the clutch actuation by the rapid change of the engine torque when the clutch is closed can be eliminated, so that consumption and wear advantages result due to the slip that occurs only temporarily at the clutch. Here, the follow-up of the clutch torque takes place with a predetermined hysteresis, i.e. the clutch torque is not changed until the engine torque has changed by a certain minimum amount, which is associated with a reduction of the switching-in time of the electric motor 12 or of the electromagnetic clutch for driving the hydraulic pump 10.

Figure 3:
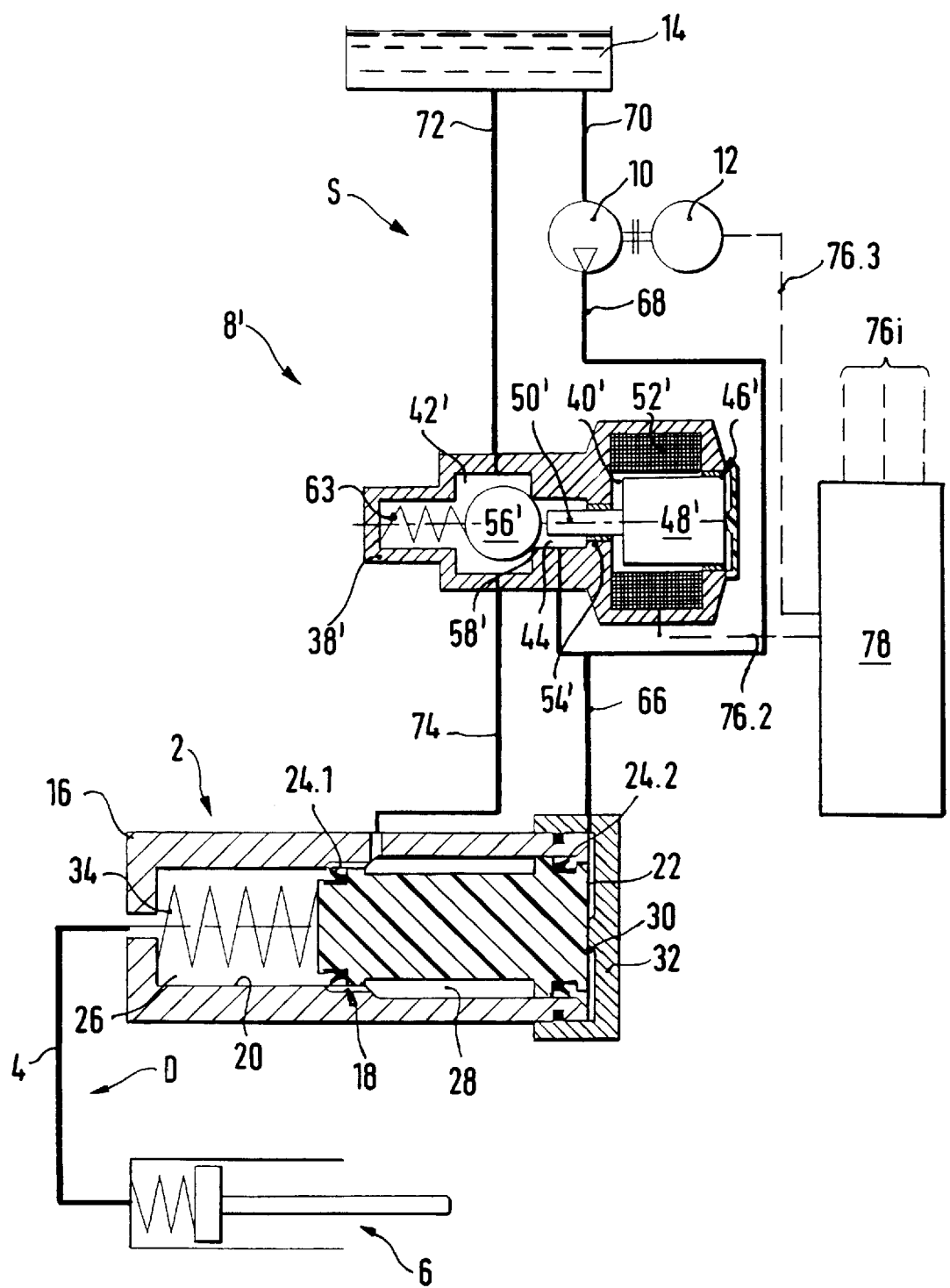

FIG. 3 shows a variant of the first example of embodiment of the hydraulic clutch actuation according to this invention illustrated in FIG. 1. The variant according to FIG. 3 differs from the first embodiment illustrated in FIG. 1 basically in that a different proportional valve 8' is used in the servo circuit S. The variant according to FIG. 3 is described below only with regard to those features that differ from the first example of embodiment according to FIG. 1.

In the proportional valve 8' shown in FIG. 3, which is a switching variant of the proportional valve 8 according to FIG. 1, there is an electromagnetically actuated 2/2 ball seat valve, which in the non-actuated state is switched into the blocking-zero-setting. The proportional valve 8' has a three-chamber valve housing 38', which contains an armature chamber 40', an outlet chamber 42' and a pressure chamber 44'. The armature chamber 40', the pressure chamber 44' and the outlet chamber 42' are arranged in this sequence in FIG. 3 from right to left, concentrically to the central axis of the valve housing 38'. The outlet chamber 42' is connected to the storage vessel 14 via the outlet line 72 and to the pressure balancing and follower device 18 in the clutch transmitter cylinder 2 via the follower line 74, while the pressure chamber 44' is connected via the pressure line 68 to the hydraulic pump 10 and via the pressure line 66 to the amplifier chamber 30 in the clutch transmitter cylinder 2.

In the armature chamber 40' of the proportional valve 8', a control piston 46' is housed, which consists of a ferromagnetic armature 48' having a valve stem 50' centrally mounted thereon and is electromagnetically axially displaceable in the armature chamber 40'. For this purpose, in the radial wall of the armature chamber 40' a magnetic coil 52' is provided, which at least partly concentrically surrounds the armature 48' and, together with the armature 48', forms a magnetic drive, by means of which the control piston 46' can be displaced as desired in the axial direction of the armature chamber 40'. The valve stem 50' of the control piston 46' is guided hydraulically sealed in a partition wall 54' of the valve housing 38' between the armature chamber 40' and the pressure chamber 44', and projects into the pressure chamber 44'. The pressure chamber 44' is connected to the outlet chamber 42' by a through bore or stepped bore lying coaxially with the control piston 46', and which is provided at the side towards the outlet chamber with a centrally machined valve seating 58'.

In the outlet chamber 42' a valve body 56' is mounted, which is formed as a metal ball, which can be mechanically loaded with an actuation force by the valve stem 50' of the control piston 46', passing sealed through the partition wall 54' between the armature chamber 40' and the pressure chamber 44'. The valve body 56' can be loaded by the valve pin 50' only with a compressive force. The stroke of the armature 48' of the control piston 46' in the armature chamber 40' corresponds to the necessary valve opening travel of the valve body 56' in the armature chamber 42'.

In the outlet chamber 42' there is also mounted a closure spring 63, which presses the valve body 56' in its basic position against the valve seating 58', with the result that in the blocking-zero-setting of the proportional valve 8' , the pressure chamber 44' and the outlet chamber 42' are hydraulically sealingly separated from each other. The closure spring 63 is so designed that the value of its prestressing force is equal to the value of the force that acts at the pressure chamber side on the valve body 56' when the maximum working pressure necessary for disengaging the clutch is present in the pressure circuit D. The maximum working pressure necessary for disengaging the clutch is, in a clutch characteristic curve having "drop-off" characteristic, that pressure that is required for generating the force at the apex point of the disengagement force curve F in FIG. 2A, whereas the maximum working pressure required for disengaging the clutch in the case of a clutch characteristic curve having a continually rising characteristic is that pressure that is required for generating the disengagement force F at which no torque M is any longer transmitted (broken line in FIG. 2B).

In the operation of the hydraulic clutch actuation system according to FIG. 3, the magnetic coil 52' of the proportional valve 8' therefore does not need to be energized for disengaging the clutch, because the valve body 56' cannot lift off the valve seating 58' against the force of the closure spring 63 until a servo pressure is generated in the servo circuit S by the hydraulic pump 10 which lies above the servo pressure required for generating the maximum required working pressure in the pressure circuit D. For engaging the clutch, the magnetic coil 52' is energized, so that a defined valve gap can be adjusted between the valve body 56' and the valve seating 58' via the valve stem 50' of the control piston 46', by means of which the servo pressure in the servo circuit S can be controlled as described with reference to FIG. 1. The control of the engagement operation can in principle be carried out as a function of the clutch characteristic curve as described in relation to FIG. 1, with the reservation that, in the case of a clutch characteristic curve having a continually ascending characteristic, the coil current $I_V$ of the magnetic drive in the proportional valve 8' cannot serve as actual value for the control circuit, because the magnetic drive is not energized for disengaging the clutch.

Figure 4:
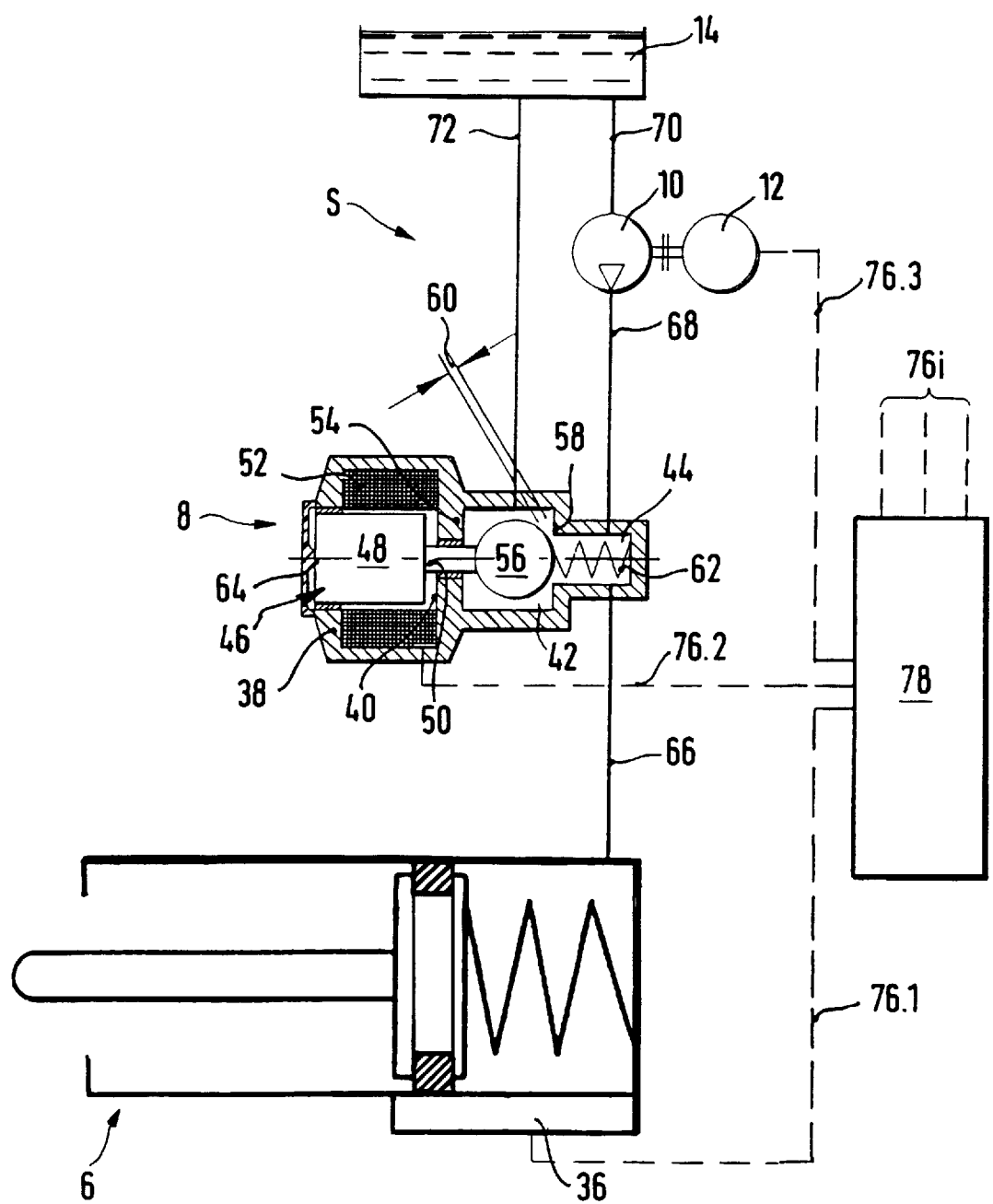

FIG. 4 shows the second example of embodiment of the hydraulic clutch actuation system according to this invention, in the non-actuated state. The second embodiment differs from the first according to FIG. 1 only in that no clutch transmitter cylinder is provided and thus a separate pressure circuit is dispensed with. According to this example of embodiment, the servo circuit S is connected without a follower line 74 via the pressure line 66 directly to the clutch receiver cylinder 6, which is provided with the displacement pick-up 36. The construction and function of the servo circuit S correspond in other respects to that of the first example of embodiment according to FIG. 1, so that a further description can be dispensed with at this point. Furthermore, the methods described in relation to the first example of embodiment for regulating the disengagement and engagement operations of the clutch can be carried out in principle in the same way with the second example of embodiment. Finally, the servo circuit S of the second example of embodiment can be constructed also as illustrated in FIG. 3, the pressure circuit D with clutch transmitter cylinder 2 and also the follower line 74 being omitted and the pressure line 66 being connected directly to the clutch receiver cylinder 6.

Figure 5:
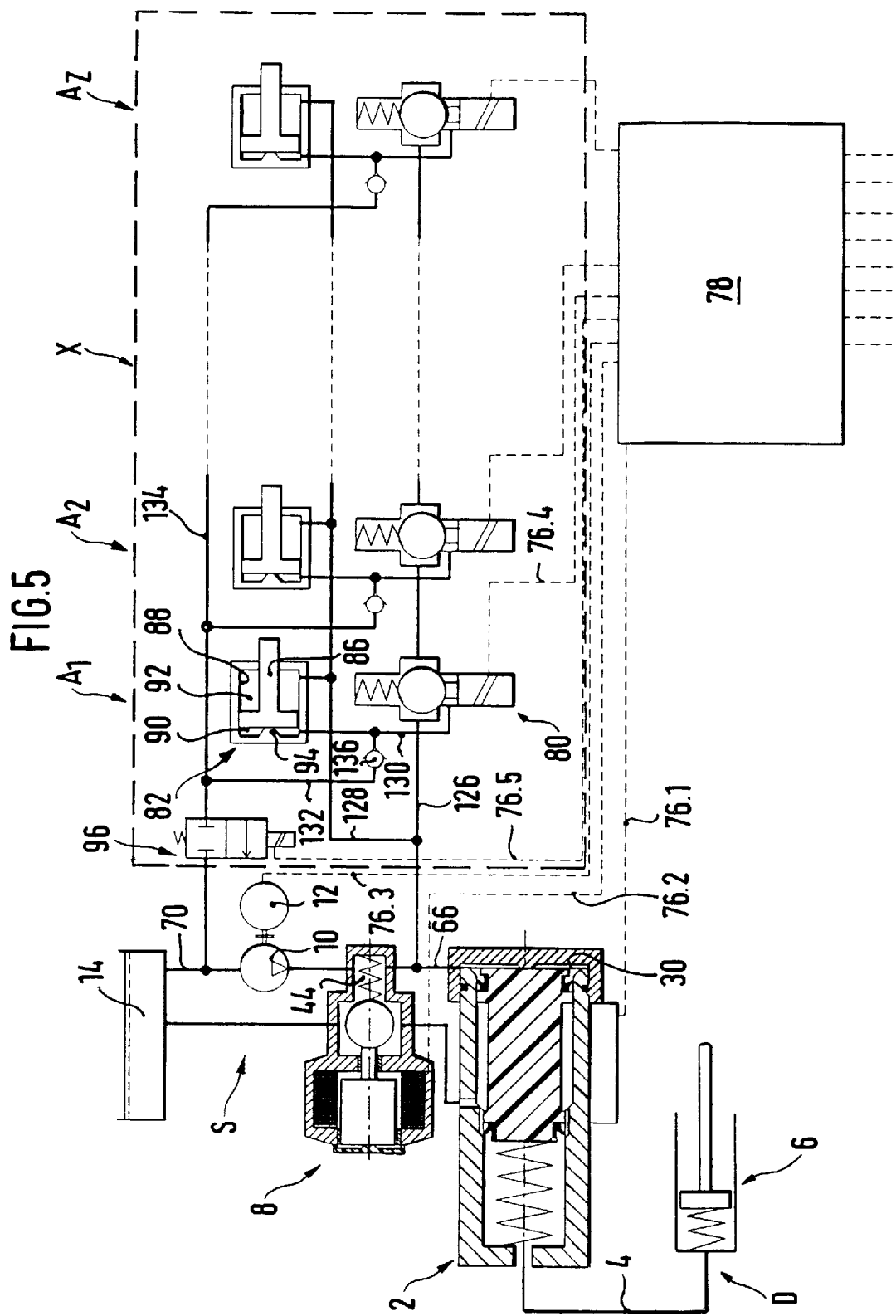

FIG. 5 shows the third example of embodiment of the hydraulic clutch actuation system according to this invention, in the non-actuated state. The components corresponding to components in FIG. 1 are given the same references and are not again explained below. Although the third example of embodiment corresponds, in respect of the construction and functioning of the servo circuit S and of the pressure circuit D, substantially to the first example of embodiment according to FIG. 1, depending upon the particular case the servo circuit S can also be constructed as in FIG. 3, or only the servo circuit S according to FIG. 4 can be provided. In all cases, however, in the pressure line 68 between the hydraulic pump 10 and the proportional valve 8, 8', a non-return valve blocking towards the hydraulic pump 10 is provided, which is not shown in FIG. 5 for reasons of simplicity.

For an automatic switching operation, which is preceded by the automatic clutch disengagement action, according to FIG. 5 the servo circuit S is connected to a hydraulic switching circuit X, which has a plurality of switching or gear-shift steps $A_1$ to $A_z$. The construction and functioning only of the first switching step $A_1$ in the switching circuit X is described below. The construction, arrangement and functioning of the other switching steps $A_2$ to $A_z$ in the switching circuit X, the number 2 of which is dependent upon the gearbox design, are identical for each switching or gear-shift stage and therefore do not need to be explained in more detail.

According to FIG. 5, the first switching step $A_1$ is provided with a further proportional valve 80, which is an electromagnetically actuated 2/2 ball seat valve, which in the non-actuated state is brought into the blocking-zero-setting. This proportional valve 80 constitutes a switching variant (logic variant) of the proportional valve 8 of the servo circuit S and controls a switching cylinder 82 for actuating a clutch sleeve 84 (not shown in FIG. 5) on a hub (not shown) in the gearbox. A preferred form of construction of the clutch sleeve 84 is described in greater detail with reference to FIG. 7.

The switching cylinder 82 possesses a piston 86, which divides a cylinder bore 88 of the switching cylinder 82 into a working chamber 90 and a restoring chamber 92. In the basic setting of the switching cylinder 82, the piston 86 strikes against the cylinder base 94 of the switching cylinder 82. As already mentioned, each gear step or switching step $A_1$ to $A_z$ is provided with a proportional valve 80 and a switching cylinder 82.

The switching circuit X is, furthermore, provided with a switching valve 96 in the form of an electromagnetically controllable 2/2 way valve, which is switched into the blocking position as basic setting and to the through position when actuated, and the interconnection of which with the remaining components of the switching circuit X will be described in more detail. In the circuit X, only one switching valve 96 is required.

Figure 6:
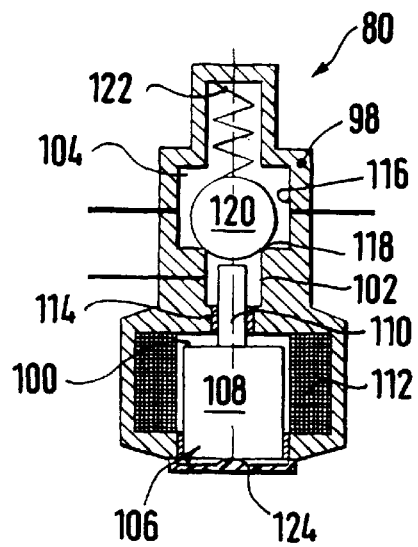

The proportional valve 80 illustrated to larger scale in FIG. 6 has a three-chamber valve housing 98, which defines an armature chamber 100, control chamber 102 and pressure chamber 104. The armature chamber 100, the control chamber 102 and the pressure chamber 104 are arranged ascending in this sequence in FIG. 6 and concentrically to the central axis of the valve casing 98.

In the armature chamber 100 of the proportional valve 80, a control piston 106 is housed, which consists of a ferromagnetic armature 108 with a valve stem 110 concentrically mounted thereon, and is electromagnetically axially displaceable in the armature chamber 100.

For this purpose, in the radial wall of the armature chamber 100, a magnetic coil 112 is provided, which at least partly concentrically surrounds the armature 108 and, together with the armature 108, forms a magnetic drive, by means of which the control piston 106 can be displaced axially of the armature chamber 100 when desired. The valve stem 110 of the control piston 106 is hydraulically sealingly guided in a partition wall 114 of the valve casing 98 between the armature chamber 100 and the control chamber 102 and projects into the control chamber 102.

The control chamber 102 is connected to the pressure chamber 104 by a through bore or stepped bore 116, lying coaxially with the control piston 106, which bore is provided at the pressure chamber side with a concentrically machined valve seating 118.

In the pressure chamber 104, a valve body 120 is disposed, which is formed as a metal ball, which can be loaded mechanically with an actuating force via the valve stem 110 of the control piston 106, passing in sealed manner through the partition wall 114 between the armature chamber 100 and the control chamber 102. The valve body 120 can be loaded only with a compressive force by the valve stem 110 of the control piston 106, because the valve body 120 and the valve stem 110 are two separate components. The length of the stroke of the armature 108 of the control piston 106 in the armature chamber 100 corresponds to the necessary valve opening travel of the valve body 120, disposed in the pressure chamber 104 and in operative connection with the valve stem 110 of the control piston 106.

In the pressure chamber 104, a restoring spring 122 is also housed, which presses the valve body 120 in its basic setting against the valve seating 118, causing the control chamber 102 and the pressure chamber 104 to be hydraulically sealed from each other in the blocking-zero-setting of the proportional valve 80. Also, the restoring spring 122 pushes the control piston 106, lying in series with the valve body 120, against a stop 124, which is formed on the valve housing 98 at the end of the armature chamber 100 remote from the control chamber 102.

In the following, with reference to FIG. 5, the circuit connection of the proportional valve 80 to the switching cylinder 82 and the switching Valve 96 in the switching circuit X and also the connection of the switching circuit X to the servo circuit S are described.

The pressure chamber 104 of the proportional valve 80 is connected, via a pressure line 126, to the pressure line 66 between the pressure chamber 44 of the proportional valve 8 in the servo circuit S and the amplifier chamber 30 of the clutch transmitter cylinder 2. For the basic setting of the first switching step $A_1$ in the switching circuit X, the pressure line 126 branches into a pressure line 128, which connects the restoring chamber 92 of the switching cylinder 82 and the pressure chamber 104 of the proportional valve 8 to each other. Furthermore, between the proportional valve 80 and the switching cylinder 82, a control line 130 is connected, which connects the control chamber 102 of the proportional valve 80 to the working chamber 90 of the switching cylinder 82. The control line 130 is connected, via a control line 132, to a header line 134, which is connected via the switching valve 96 to the intake line 70 between storage vessel 14 and hydraulic pump 10, so that the hydraulic circuit is closed. As a further functonal element, in the control line 132 a non-return valve 136 is provided, with blocking action towards the control line 130 and through flow towards the header line 134.

Finally, the magnetic coil 112 of the proportional valve 80 is connected by a signal line 76.4 to the control electronic unit 78, while the switching valve 96 is connected to the control electronic unit 78 by means of a signal line 76.5.

In the following, the method of functioning of the third example of embodiment of the hydraulic clutch actuating system according to this invention is described.

If, after a clutch operation has been completed, which was carried out as described with reference to FIGS. 1, 3 and 4, the automatic switching operation is carried out, then in the basic setting of the first switching stage $A_1$ illustrated in FIG. 5, with the clutch transmitter cylinder 2 loaded with servo pressure and with the clutch pressure plate lifted off (released) by the clutch receiver cylinder 6, the servo pressure is present via the pressure lines 66, 126 and 128 in the restoring chamber 92 of the switching cylinder 82, and via the pressure lines 66 and 126 in the pressure chamber 104 of the proportional valve 80, which servo pressure holds the piston 86 in abutment against the cylinder base 94 and in addition increases the closure force of the valve body 120, spring-loaded by the restoring spring 122, of the proportional valve 80 against the valve seating 118. The pressure fluid in the control chamber 102 of the proportional valve 80, the control lines 130 and 132, the header line 134 and the working chamber 90 of the switching cylinder 82, is contained unpressurized. The proportional valve 80 and the switching valve 96 are situated in their blocking basic setting.

The magnetic coil 112 of the proportional valve 80 of each required switching step $A_1$, $A_2$, $A_z$, is now governed by the control electronic unit 78, whereupon the control piston 106 of the proportional valve 80 is electromagnetically driven and moves towards the valve body 120 and pushes the latter against the mechanical force of the restoring spring 122 and of the hydraulic closure force acting on the valve body 120 away from the valve seating 118, so that a valve gap opens between the valve seating 118 and the valve body 120. As a consequence, as fluid flows through the valve gap in the proportional valve 80, a switching pressure is generated, which propagates via the control chamber 102 of the proportional valve 80 into the control lines 130 and 132, the header line 134 and the working chamber 90 of the switching cylinder 82.

Figure 7:
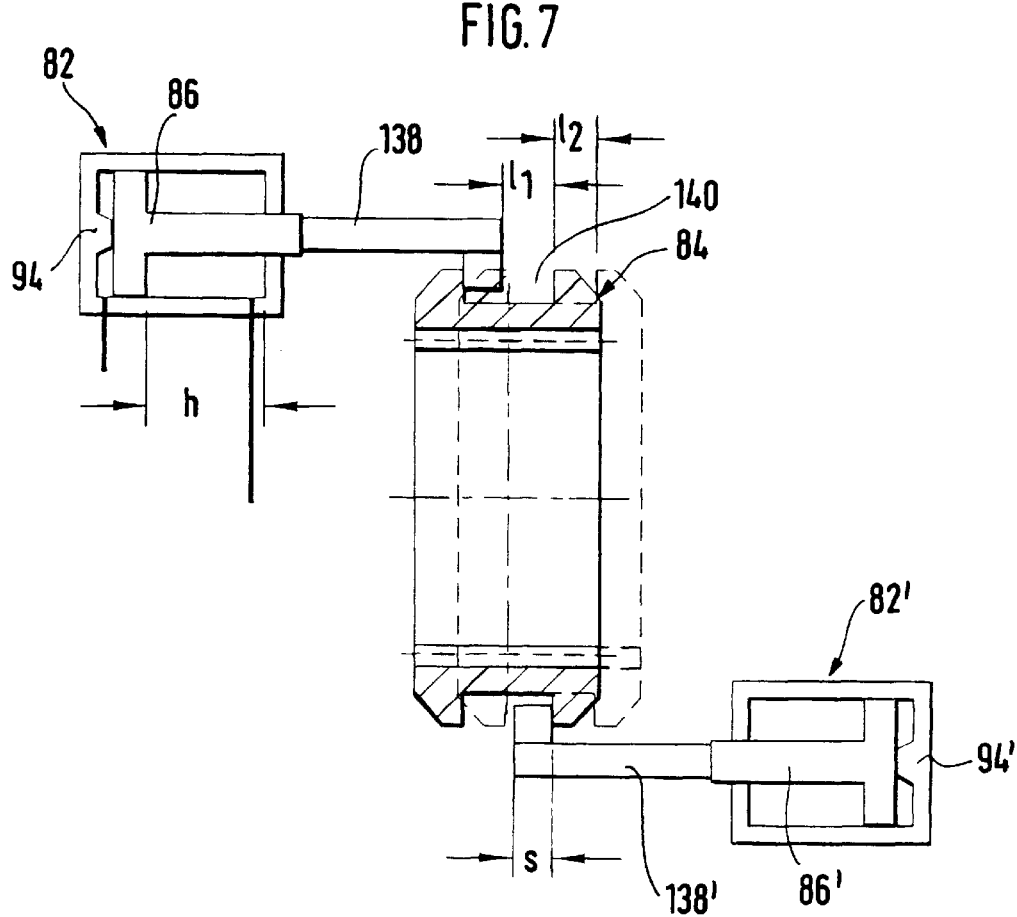

The piston 86 of the switching cylinder 82, which is operatively connected to the clutch sleeve 84 to be described in more detail with reference to FIG. 7, is loaded with a force which corresponds to the product of the difference between the hydraulic active surfaces on the two sides of the piston 86 and the switching pressure active in the restoring chamber 92, and is displaced, so that the switching operation is carried out by the clutch sleeve 84 with synchronization of the switching operation.

After completion of the switching operation, the electrical control of the magnetic coil 52 of the proportional valve 8 and of the magnetic coil 112 of the proportional valve 80 is terminated via the control electronic unit 78 and the switching valve 96 is switched to the through-zero-setting. As a result, no servo pressure and therefore no switching pressure is any longer generated. The piston 22 of the clutch transmitter cylinder 2 travels, as described with reference to FIG. 1, into its basic position, so that the clutch pressure plate again comes into engagement with the clutch disc. The valve body 120 is pushed by the force of the restoring spring 122 onto the valve seating 118 and the switching valve 96 is switched into the blocking-zero-setting. The piston 86 of the switching cylinder 82 is thus held in its forward or extended position by the pressure fluid contained between the control chamber 102 of the proportional valve 80 and the switching valve 96. The switching stage is thus secured.

For the automatic switching back of the engaged switching stage (gear stage) into idling with the internal combustion engine running, or for changing into another switching stage, the switching valve 96 is required, wherein first of all the automatic clutch operation as described with reference to FIGS. 1, 3 and 4 must be carried out and thereafter the electromagnetically actuated switching valve 96 is switched from its blocking-zero-setting into its through setting. By means of the pressure in the working chamber 90 of the switching cylinder 82, applied via the pressure line 128, the piston 86 of the switching cylinder 82 together with the clutch sleeve 84 is pushed back by the pressure fluid into abutment against the cylinder base 94 of the switching cylinder 82. The pressure fluid previously locked in the working chamber 90 of the switching cylinder 82 is forced via the control lines 130, 132 through the non-return valve 136 and through the header 134 through the opened switching valve 96 into the intake line 70. With abutment of the piston 86 against the cylinder base 94 of the switching cylinder 82, the switching valve 96 is again switched back into its basic setting. The switching step $A_1$ is now uncoupled.

For a succeeding change into a different switching step (gear step), the clutch operation and the switching operation are to be carried out accordingly as explained above.

In FIG. 7, a preferred form of construction of the connection of the double acting switching cylinders 82, 82' of two switching steps with the aforementioned clutch sleeve 84 of the gearbox is illustrated. According to FIG. 7, the piston 86 of the switching cylinder 82 is firmly connected to a switching claw 138, only schematically illustrated, which engages form-fittingly into a recess 140, formed on the outer periphery of the clutch sleeve 84. The engagement contour of the switching claw 138 may, for example, be formed as a simple hook or a fork with engagement points displaced around the periphery.

The clutch sleeve 84 is displaceable axially each time by a distance, which corresponds to the stroke h of the switching cylinder 82, from a central position along the central axis of the switching cylinder 82 in either direction. The displacement of the clutch sleeve 84 for one switching step (gear step) is composed of an idling displacement $l_1$ and a switching displacement $l_2$. On the opposite side of the clutch sleeve 84 or, depending upon the construction, angularly offset from the switching cylinder 82, the switching cylinder 82' for the next switching step, for example the switching step $A_2$, is disposed at the periphery of the clutch sleeve 84.

In its basic setting, the clutch sleeve 84 is hydraulically arrested in the above described manner by the pistons 86, 86' of the switching cylinders 82, 82', positioned in abutment against the cylinder ends 94, 94', and by the switching claws 138, 138', engaging form-fittingly into the recess 140 of the clutch sleeve 84.

If now, in a switching operation, the pressure-loaded piston 86 of the switching cylinder 82 and thus the clutch sleeve 84 is axially displaced on the hub of the gear, the switching claw 138, after it has travelled the idling distance $l_1$, comes into bearing against the opposite side of the wall of the recess 140 of the clutch sleeve 84 and displaces the clutch sleeve 84 by the switching distance $l_2$. The displaced position of the clutch sleeve 84 is shown in broken line in FIG. 7. The switching claw 138' of the switching cylinder 82' of the next switching stage, still fixed in its basic setting, remains out of engagement with the clutch sleeve 84. This is attributable to the fact that the thickness s of the relevant switching claw 138, 138', is smaller than the idling travel $l_1$ of the clutch sleeve 84.

At the change into the next switching step, the piston 86 of the switching cylinder 82, together with the clutch sleeve 84, travels as described above into the basic setting, after which, according to the sequence described with reference to FIGS. 1, 3 and 4 and 5, for example, switching step $A_2$ can be performed with the switching cylinder 82'.

A method and a device for the hydraulic actuation of a clutch in operative connection with a clutch transmitter cylinder, in particular for automobiles, is disclosed, in which a servo pressure is generated in a servo circuit, which serves for the hydraulic control of a clutch transmitter cylinder for the purpose of generating in a pressure circuit a working pressure, which is applied to the clutch receiver cylinder, or is applied directly to the clutch receiver cylinder, in order to apply there a force required for disengaging the clutch. According to the invention, the servo pressure is adjusted in defined manner in the servo circuit for disengaging and engaging the clutch, for which purpose the servo circuit possesses a proportional valve. As a result, with a small expenditure on technical equipment, an automated actuation with improved response and operational behaviour of the clutch is made possible. Furthermore, a method and a device for switching a mechanical gear is disclosed, in which the servo pressure of the clutch disengagement is used for switching (shifting) the clutch sleeves of the mechanical gear.

Reference list

| | | |
|---|---|---|
| 2 | Clutch transmitter cylinder | |
| 4 | Pressure line | |
| 6 | Clutch receiver cylinder | |
| 8 | Proportional valve | (8') |
| 10 | Hydraulic pump | |
| 12 | Electric motor | |
| 14 | Storage vessel | |
| 16 | Housing | |
| 18 | Pressure balancing and follower device | |
| 20 | Housing bore | |
| 22 | Piston | |
| 24.1 | Sealing element | |
| 24.2 | Sealing element | |
| 26 | Working chamber | |
| 28 | Follower chamber | |
| 30 | Amplifier chamber | |
| 32 | Housing bottom | |
| 34 | Compression spring | |
| 36 | Displacement pick-up | |
| 38 | Valve housing | (38') |
| 40 | Armature chamber | (40') |
| 42 | Outlet chamber | (42') |
| 44 | Pressure chamber | (44') |
| 46 | Control Piston | (46') |
| 48 | Armature | (48') |
| 50 | Valve stem | (50') |
| 52 | Magnetic coil | (52') |
| 54 | Partition wall | (54') |
| 56 | Valve body | (56') |
| 58 | Valve seating | (58') |
| 60 | Valve gap | |
| 62 | Restoring spring | |
| 63 | Closure spring | |
| 64 | Abutment | |
| 66 | Pressure line | |
| 68 | Pressure line | |
| 70 | Intake line | |
| 72 | Outlet line | |
| 74 | Follower line | |
| 76 | Signal line | (76.1–76.5, 76i) |
| 78 | Control electronic unit | |
| 80 | Proportional valve | |
| 82 | Switching cylinder | (82') |
| 84 | Clutch sleeve | |
| 86 | Piston | (86') |
| 88 | Cylinder bore | |
| 90 | Working chamber | |
| 92 | Restoring chamber | |
| 94 | Cylinder bottom | (94') |
| 96 | Switching valve | |
| 98 | Valve housing | |
| 100 | Armature chamber | |
| 102 | Control chamber | |
| 104 | Pressure chamber | |
| 106 | Control piston | |
| 108 | Armature | |
| 110 | Valve stem | |
| 112 | Magnetic coil | |
| 114 | Partition wall | |
| 116 | Stepped bore | |
| 118 | Valve seating | |
| 120 | Valve body | |
| 122 | Restoring spring | |
| 124 | Abutment | |
| 126 | Pressure line | |
| 128 | Pressure line | |
| 130 | Control line | |
| 132 | Control line | |
| 134 | Header line | |
| 136 | Non-return valve | |
| 138 | Switching claw | (138') |
| 140 | Recess | |
| $A_1$ | First switching step | |
| $A_2$ | Second switching step | |
| $A_Z$ | Last switching step | |

-continued

Reference list

| | |
|---|---|
| D | Pressure circuit |
| F | Disengagement force |
| $I_M$ | Current to electric motor for driving the hydraulic pump |
| $I_V$ | Coil current of magnetic drive in proportional valve |
| M | Clutch torque |
| S | Servo circuit |
| X | Switching circuit |
| a | Disengagement displacement of the clutch pressure plate |
| h | Stroke of the switching cylinder |
| $l_1$ | Idling displacement of the clutch sleeve |
| $l_2$ | Switching displacement of the clutch sleeve |
| s | Thickness of the switching claw |

We claim:

1. An improved method for hydraulically actuating of an automobile clutch so that the clutch may be tuned, in an optimum manner, to at least one selected operating characteristic of the automobile; where the clutch is operatively connected with power circuit, which includes a clutch receiver cylinder that is actuable by the application thereto of a working pressure fluid having a preselected pressure; and where the automobile includes an engine, the method comprising the steps of:

providing a source of working pressure fluid having variable pressure, including the preselected pressure, and including generating a servo pressure fluid in a servo circuit where the pressure of the servo pressure fluid is proportional to a preselected operating characteristic of the automobile; and applying working pressure fluid, which has the preselected pressure, to the clutch receiver cylinder for actuating the clutch receiver cylinder in response to generation of the servo pressure fluid in the servo circuit.

2. The improved method according to claim 1 wherein the power circuit include a clutch transmitter cylinder that is operatively connected with the clutch receiver cylinder; and including the step of applying the servo pressure fluid from the servo circuit to the clutch transmitter cylinder so as to cause working pressure fluid to, in turn, be applied to the clutch receiver cylinder.

3. The improved method according to claim 2 wherein the servo pressure fluid is the working pressure fluid; and including the step of applying the servo pressure fluid to the clutch receiver cylinder after the servo pressure fluid has been pressurized to the preselected pressure in the servo circuit.

4. The method according to claim 2 wherein the characteristic curve, which represents the disengagement force of the clutch over the disengagement travel of the clutch, has substantially the form of a downwardly open parabola; and regulating the operation of the clutch on the basis of determining the value of the disengagement travel of the clutch and a value representing another operating characteristic of the clutch.

5. The method according to claim 4 wherein the clutch transmitting cylinder and the clutch receiver cylinder each include a reciprocal movable piston; and characterized in that a value proportional to the disengagement travel of the clutch can be determined by sensing selectively one of the position of the piston in the clutch transmitter cylinder or the position of the piston in the clutch receiver cylinder.

6. The method according to claim 2 wherein the characteristic curve, which represents the disengagement force of the clutch over the disengagement travel of the clutch, increases steadily with increasing disengagement travel; and wherein regulating the operation of the clutch on the basis of determining the value of the disengagement force of the clutch and a value representing another operating characteristic of the clutch.

7. The method according to claim 6, wherein a value proportional to the disengagement force of the clutch can be determined by sensing selectively one of the pressure of the working pressure fluid in the pressure circuit or the pressure of the servo pressure fluid in the servo circuit.

8. The method according to claim 6, wherein servo circuit includes a hydraulic pump, which has an electric motor drive, and a proportional valve, which has a magnetic drive, for generating the pressure of the servo pressure fluid in the servo circuit; wherein the pressure of the servo fluid pressure fluid, generated by the proportional valve, is governed by the electrical coil current supplied to the magnetic drive and the rate of discharge from the hydraulic pump; and characterized in that a value proportional to the disengagement force of the clutch can be determined by sensing selectively one of the coil current of the magnetic drive for the proportional valve or the electrical current supplied to the electric motor drive for the hydraulic pump in the servo circuit.

9. The method according to claim 2 characterized in that initially sensing the engine torque associated with the clutch and setting a pressure of the servo pressure fluid in the servo circuit as a function of the sensed engine torque, and applying the servo pressure fluid to selectively one of the clutch receiver cylinder or the clutch transmitter cylinder such that a torque may be transmitted through the clutch, which is smaller than the maximum torque that can be transmitted by the clutch but is greater, by a predetermined amount, than the sensed engine torque.

10. The method according to claim 9, characterized in that the pressure of the servo pressure fluid is set in the servo circuit as a function of the initially sensed engine torque and is not again reset until after engine torque differs, by a predetermined amount, from the initially sensed engine torque.

11. An improved system for the hydraulic actuation of an automobile clutch such that clutch activation may be tuned, in an optimum manner, to at least one selected operating characteristic of the automobile and where the automobile includes an engine, the system comprising:

a power circuit;

a servo circuit operatively connected with the power circuit;

a clutch receiver cylinder that is in the power circuit, that is operatively connected with the clutch, and that is selectively actuable by the application thereto of a working pressure fluid having a preselected pressure;

means for providing a source of working pressure fluid having varying pressures, which pressures include the preselected pressure, and including means for generating pressure in a servo pressure fluid in the servo circuit, with the pressure of the servo pressure fluid being proportional to a selected operating characteristic of the automobile; and means for applying working pressure fluid, having the preselected pressure, to the clutch receiver cylinder for activation of the clutch receiver cylinder in response to generation of the servo pressure fluid in the servo circuit.

12. The system according to claim 11 which includes a clutch transmitter cylinder that has a servo chamber, a working chamber and a piston reciprocally movable in the working chamber; and wherein the servo pressure fluid is applied at the servo chamber of the clutch transmitter cylinder for the purpose of generating, by loading the piston in the working chamber of the clutch transmitter cylinder, the pressure of the working pressure fluid, which is applied at a clutch receiver cylinder, for the purpose of creating a disengagement force at the clutch, characterized in that the servo circuit includes a proportional valve by which the pressure of the servo pressure fluid in the servo circuit may be adjustable in a preselected manner.

13. The system according to claim 12, characterized in that the hydraulic effective surface of the piston in the clutch transmitter cylinder on the servo chamber side is greater than the hydraulic effective surface of the piston on the working chamber side.

14. The system according to claim 11, characterized in that the servo circuit comprises a proportional valve by which the pressure of the servo pressure fluid in the servo circuit may be adjustable in defined manner.

15. The system according to claim 11 wherein the servo circuit includes a proportional valve that includes a pressure chamber and a valve body, which is adapted to define a valve gap through which servo pressure fluid is forced when the clutch is actuated; and wherein the valve body is adapted to control, in an electromagnetically controlled manner, the valve gap for the purpose of adjusting, in defined manner, the pressure of the servo pressure fluid as pressure head in the pressure chamber of the proportional valve, which pressure chamber is hydraulically connected selectively to the clutch transmitter cylinder or the clutch receiver cylinder.

16. The system according to claim 15, characterized in that the pressure chamber of the proportional valve is also connected to a hydraulic pump so that when the clutch is actuated, the hydraulic pump is adapted to the supply servo pressure fluid to and through the valve gap of the proportional valve.

17. The system according to claim 11, wherein the servo circuit includes a proportional valve characterized in that the proportional valve is prestressed to a blocking-zero-setting; wherein the proportional valve includes a pressure chamber hydraulically connected to a fluid pressure source and selectively to one of the servo chamber of the clutch transmitter cylinder or the clutch receiver cylinder; and wherein the proportional valve includes a valve body which is adapted to define a valve gap that limits, in electromagnetically controllable manner, the valve gap through which servo pressure fluid is forced when the clutch is being engaged so as to adjust the pressure of the servo pressure fluid in defined manner as pressure head in the pressure chamber, and that is prestressed against the pressure in the pressure chamber by a closure spring.

18. The system according to claim 17, characterized in that the proportional valve is a ball seat valve having a spherical valve body that, together with an annular valve seating, defines the valve gap.

* * * * *